United States Patent Office 3,069,395
Patented Dec. 18, 1962

3,069,395
HALOTHIOACYL FLUORIDES AND
POLYMERS THEREOF
William J. Middleton, Claymont, Del., assignor to E. I.
du Pont de Nemours and Company, Wilmington, Del.,
a corporation of Delaware
No Drawing. Filed Feb. 9, 1959, Ser. No. 791,859
19 Claims. (Cl. 260—79)

This invention relates to polymeric materials and their preparation, and more particularly to organic polymers containing both sulfur and fluorine.

Many varieties of polymers are known. Some have achieved commercial success in various applications, including such uses as films, fibers, coating compositions, adhesives, plastics, and the like. While the known polymers do have a diversity of properties or characteristics which result from particular structural composition and molecular weight, new types of polymers are continuously being sought.

One of the objects of this invention is to provide a new type of polymer. Another object is to provide a new class of polymers having novel structural units and which possess valuable properties and methods for preparing them. Other objects will become apparent hereinafter.

These and other objects of this invention are obtained by providing polymers of α-fluorothioacyl fluorides, including their copolymers with other copolymerizable monomers.

A preferred group of the polymers of this invention are polymers of α-fluorothioacyl fluorides wherein any other substituent besides a fluorine on the α-carbon, i.e., the carbon adjacent to the

group, is hydrogen, halogen, hydrocarbon or halogenated hydrocarbon. These preferred polymers have recurring structural units of the formula

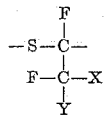

wherein X and Y are hydrogen, halogen (fluorine, chlorine, bromine or iodine), monovalent hydrocarbon or halogenated monovalent hydrocarbon radicals, and especially hydrocarbon or halogenated hydrocarbon radicals having a 1–6 carbon atoms. An especially preferred group of polymers are the polymers of perfluorothioacyl fluorides, i.e., of compounds of formula

where $R_f$ represents a perfluorocarbon group.

The polymers of this invention range from sticky, semi-solids to plastics, to solid elastomers, and are generally colorless when pure. Many are soluble in ethers, e.g., diethyl ether, and some particular polymers are also soluble in other organic solvents. Poly(trifluorothioacetyl fluoride) is insoluble in most common solvents. The polymers are generally capable of being pressed into self-supporting films, some of which are elastomeric.

Monomeric trifluorothioacetyl fluoride is also a part of this invention.

The polymers of this invention are prepared by polymerizing monomeric α-fluorothioacyl fluorides, preferably those having the formula

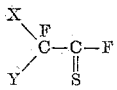

wherein X and Y have the meanings specified above, or a mixture of such a monomer with one or more other copolymerizable monomers, in the presence of an ionic initiator or in the presence of ultraviolet light.

The polymerization in the presence of an ionic initiator is conveniently carried out at relatively low temperatures, e.g., at a temperature between 0° and —120° C. or lower, in the presence of a solvent such as an ether, e.g., diethyl ether or tetrahydrofuran, or a hydrocarbon, e.g., pentane, that remains liquid at the operating temperature that is being used. The preferred temperature range for carrying out the polymerization is between —50° and —100° C. In this temperature range, diethyl ether is a particularly effective solvent. Under these conditions hard, solid polymers are obtained. The polymerization times required vary from about 1 hr. up to several days, e.g., 3–4 days, depending on the particular operating conditions and the particular α-fluorothioacyl fluoride being polymerized.

A wide variety of ionic initiators can be used in this process. Specific initiators that are operable include dimethylformamide, primary, secondary and tertiary amines, e.g., triethylamine, diisopropylamine, and aniline, triphenylphosphine, nitrosodimethylamine, quaternary ammonium chlorides having no hydrogen on the quaternary ammonium nitrogen, e.g., tetraethyl quaternary ammonium chloride, quaternary ammonium methoxide, and the like. Dimethylformamide is a particularly effective initiator in this reaction. The ionic initiators can be employed in concentrations ranging from about 0.2% to 20% of the weight of the monomer being polymerized.

The polymerization in the presence of ultraviolet light as the initiator is conveniently carried out in the presence of inert solvents such as highly halogenated hydrocarbons, e.g., dichlorodifluoromethane. Any convenient source of ultraviolet light can be used. For example, any of the commercially available lamps that are relatively high in ultraviolet output are suitable. Generally speaking, mercury vapor arc lamps are preferred since they provide ia relatively intense source of ultraviolet light. Many lamps of this type are available and they include low and high-pressure lamps with various types of envelopes. The most preferred are those with quartz envelopes since such envelopes permit the highest percent transmission of ultraviolet light.

The temperature and pressure at which the polymerization in the presence of ultraviolet light is carried out are not critical. It is convenient to use room temperature and atmospheric pressure but lower or higher temperatures and lower or higher pressures can be used if desired. It is convenient to carry out the polymerization at the boiling point of the solvent being used. At ordinary temperatures and pressures, the polymerization is substantially complete in about 1 hour. However, the polymerization can be continued for several hours, e.g., 6–8 hours, or even more, if desired.

As indicated above, the polymers of this invention include copolymers of the α-fluorothioacyl fluorides with one or more other α-fluorothioacyl fluorides, and with other copolymerizable monomers which contain substantial proportions, i.e., at least 5 mole percent of the α-fluorothioacyl fluoride. Examples of typical monomers which can be copolymerized with the α-fluorothioacyl fluorides include ethylenically unsaturated compounds that undergo vinyl-type polymerization, e.g., propylene, and thiocarbonyl compounds, e.g., thiocarbonyl fluoride, thiocarbonyl fluoride chloride, and fluorinated thioketones. These copolymers can be prepared by subjecting mixtures of the α-fluorothioacyl fluoride with one or more of the other polymerizable monomers in the desired proportions to the polymerizing conditions described in the preceding paragraphs.

The polymers of α-fluorothioacyl fluorides can be isolated from the polymerization systems in various ways. In one method, the solvent is removed by evaporation or distillation and the residue obtained can be washed with water or other inert solvent if desired. In another method, the solution of the polymer is poured into a non-solvent, e.g., petroleum ether, to precipitate the polymer, or a non-solvent can be added to the polymerization solution to precipitate the polymer. The precipitated polymer can then be washed and dried by usual means.

The α-fluorothioacyl fluorides used in preparing the polymers of this invention can be prepared by dehydrofluorination, by means of sodium fluoride, of the mercaptans formed from the addition of hydrogen sulfide to polyfluoroolefins. They can also be prepared by sodium fluoride dehydrofluorination of the mercaptans made by reaction of polyfluoroalkyldisulfides with mercaptans such as thiophenol or octafluoropentanethiol on irradiation with ultraviolet light. Still another method for the preparation of fluorothioacyl fluorides comprises contacting a fluoroalkyl-mercury compound of the formula $(R_fCFX)_2Hg$, where $R_f$ is a fluoroalkyl radical and X is hydrogen, chloride or fluorine with sulfur or phosphorus pentasulfide at a temperature above 400° C., preferably at a temperature at which the sulfur or phosphorus pentasulfide is molten. (See Examples IX–XI.)

The polymers of this invention and their preparation from α-fluorothioacyl fluorides, as well as the preparation of the monomeric fluorides, are illustrated in further detail by the following examples in which the proportions of ingredients are expressed in parts by weight unless otherwise specified.

EXAMPLE I

*(A) Preparation of Chlorofluorothioacetyl Fluoride*

Eight parts of 2-hydro-2-chloroperfluoroethanethiol (prepared by the X-ray initiated addition of hydrogen sulfide to chlorotrifluoroethylene) is placed in a vessel equipped with a capillary nitrogen inlet tube extending to the bottom of the vessel. The top of the vessel is connected to a $^{11}/_{16}''$ by 1' reaction tube, made of glass and packed with sodium fluoride pellets. The end of the glass tube is connected to a vaccum line through two traps cooled by solid carbon dioxide-acetone. A slow stream of nitrogen is passed through the capillary and the system is evacuated to about 170 mm. of mercury pressure. A period of about 0.5 hour is required to completely volatilize the thiol. There is obtained in the cold trap 5.2 parts (corresponding to a 75% yield) of a liquid which is distilled through a small column to give 4.3 parts (62.5% of theory) of chlorofluorothioacetyl fluoride. This product is a yellow liquid, boiling at 57° C.

*Analysis.*—Calc'd for $C_2HClF_2S$: Cl, 27.2%; F, 29.1%; S, 24.5%. Found: Cl, 27.3%; F, 29.5%; S, 24.6%.

The nuclear magnetic resonance and infrared spectra obtained on this product also confirm the structure of the product.

*(B) Polymerization of Chlorofluorothioacetyl Fluoride*

Three-tenths part of chlorofluorothioacetyl fluoride is mixed with 1.5 parts of dry diethyl ether and the resulting solution is cooled in a bath of solid carbon dioxide-acetone. One drop of purified dimethylformamide is added and the mixture is stirred. After about 0.5 hour, two additional drops of dimethylformamide are added and the solution is stirred again. It becomes noticeably more viscous after the second stirring. After standing in the solid carbon dioxide-acetone bath overnight, the mixture is a virtually colorless, viscous solution. The polymer is isolated by pouring the ether solution into petroleum ether. The precipitated polymer is removed, dissolved again in diethyl ether, and the ether solution is allowed to evaporate on a glass surface. There is obtained a shiny, transparent film of the solid poly(chlorofluorothioacetyl fluoride) which is somewhat elastic.

EXAMPLE II

A solution of 4.78 parts of chlorofluorothioacetyl fluoride (prepared as described in Example I) and 20 parts of dichlorodifluoromethane in a quartz tube fitted with a reflux condenser cooled by a mixture of solid carbon dioxide and acetone is irradiated with a spiral shaped quartz, low pressure, mercury resonance lamp (approximately 10 watts) for a period of 2 hours. At the end of this time, a white solid polymer has formed as a precipitate, amounting to 4.4 parts. This white polymer is warmed (at 55° C.) under vacuum (0.1–1.0 mm. mercury) overnight.

*Analysis.*—Calc'd for $(C_2HClF_2S)_x$: Cl, 27.2%; F, 29.1%; S, 24.5%. Found: Cl, 26.7%; F, 29.7%; S, 24.5%.

This polymer of chlorofluorothioacetyl fluoride is pressed at 50–60° C. into films which possess some elasticity. When pressed at 150° C. hard, clear colorless films are obtained.

EXAMPLE III

*(A) Preparation of Difluorothioacetyl Fluoride*

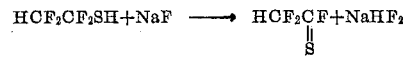

2-hydroperfluoroethanethiol (9.87 parts, prepared by the X-ray initiated addition of hydrogen sulfide to tetrafluoroethylene) is dehydrofluorinated exactly as described in Example I except that the vessel containing the thiol is cooled to −35° to −40° C. during the reaction. The product isolated in the cold trap is distilled through a small spinning band still (U.S. Patent 2,712,520) fitted with a condenser cooled by solid carbon dioxide and acetone. There is obtained 5.0 parts of difluorothioacetyl fluoride as a clear, yellow liquid boiling at 14–16° C. The nuclear magnetic resonance pattern obtained on this product is consistent with the structure written above.

*(B) Polymerization of Difluorothioacetyl Fluoride*

A solution of 1 part of difluorothioacetyl fluoride in 2.2 parts of dry diethyl ether is cooled in a bath of solid carbon dioxide and acetone. One drop of a 10% solution of dimethylformamide in dry ether is added. The mixture is agitated for a few seconds and then allowed to stand at −76° C. overnight. At the end of this period the mixture is completely solidified and is colorless. It is allowed to warm to room temperature where it becomes fluid, and is then poured into 300 parts of water. After the ether is evaporated there remains 0.82 part of white solid poly(difluorothioacetyl fluoride). This polymer is swelled by diethyl ether and is pressed at 100° C. into tough, somewhat elastic films.

EXAMPLE IV

A solution of 2 parts of difluorothioacetyl fluoride (prepared as described in Example III) and 25 parts of dichlorofluoromethane is irradiated with ultraviolet light as described in Example II for a period of 2 hours. At the end of this time, the solution is distilled to remove the solvent and the poly(difluorothioacetyl fluoride) remaining is removed from the reactor by dissolving it in anhydrous ether. Evaporation of the ether from the resulting solution upon a glass surface produces 1.58 parts of a colorless solid film of poly(difluorothioacetyl fluoride) which is elastic.

*Analysis.*—Calc'd for $(C_2HF_3S)_x$: S, 28.1%. Found: S, 28.2%.

EXAMPLE V

(A) Preparation of Trifluorothioacetyl Fluoride

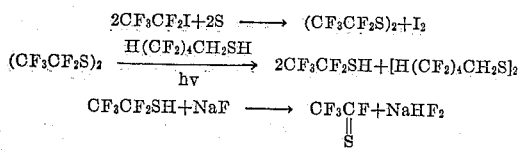

A mixture of 150 parts of sulfur and 150 parts of pentafluoroethyliodide is heated for 12 hours at 250° C. and agitated in a reaction vessel capable of withstanding high pressure. The reaction vessel is then cooled and the volatile products are removed by distillation under vacuum. The distillate is shaken with mercury and then redistilled. There is obtained 72.7 parts of pentafluoroethyl disulfide boiling at 78–79° C. and having a refractory index, $n_D^{23}$ of 1.3225.

A solution of 30.2 parts (0.1 mole) of pentafluoroethyl disulfide in 62 parts of 2,2,3,3,4,4,5,5-octafluoropentanethiol (made by reductive thiolation of 2,2,3,3,4,4,5,5-octafluoropentanal with hydrogen sulfide at about 200° C.) is irradiated with a low pressure mercury lamp for 4 days. A slow stream of nitrogen gas is passed through the reaction mixture during the irradiation and the effluent gases are condensed in a trap cooled by solid carbon dioxide and acetone. The condensate is distilled through a low temperature still and there is obtained 9.1 parts of pentafluoroethanethiol boiling at −6° to −4° C. as a very pale liquid.

Six parts of this pentafluoroethanethiol is slowly vaporized in a stream of nitrogen and passed through a column packed with 50 parts of sodium fluoride pellets and connected to a trap cooled by solid carbon dioxide and acetone. The yellow condensate obtained in the trap is distilled through a low temperature still and there is obtained 5.0 parts of trifluorothioacetyl fluoride boiling at −19° to −18° C. as a bright yellow liquid. The product is identified by examination of its nuclear magnetic resonance spectrum.

(B) Polymerization of Trifluorothioacetyl Fluoride

A solution of 2 parts of trifluorothioacetyl fluoride in 7 parts of diethyl ether is cooled in a bath of solid carbon dioxide and acetone and 1 drop of dimethylformamide is added. The solution is allowed to remain in the cooling bath for 1 hour. An additional drop of dimethylformamide is added, whereupon the entire solution becomes white and solidifies. The reaction mixture is allowed to warm to room temperature where it becomes fluid, and it is then poured into acetone. The polymer which precipitates is collected on a filter and is dried in a vacuum. There is obtained 2 parts of white rubbery poly(trifluorothioacetyl fluoride) which is insoluble in acetone, diethyl ether, alcohol, pentane, benzene and other common solvents.

*Analysis.*—Calc'd for $(C_2F_4S)_x$: C, 18.19%; F, 57.54%; S, 24.27%. Found: C, 18.21%; F, 57.31%; S, 24.01%.

A rubbery film is pressed from the poly(trifluorothioacetyl fluoride) at 10,000 lb./sq. in. pressure at 65° C. The film has an elongation of about 800% with very logy recovery. The polymer decomposes slowly when heated at 95° C.

EXAMPLE VI

(A) Preparation of Pentafluorothiopropionyl Fluoride

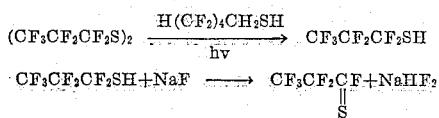

Pentafluorothiopropionyl fluoride is prepared in a manner similar to that described in Example V except that heptafluoropropyl disulfide is substituted for the pentafluoroethyl disulfide of that example.

(B) Polymerization of Pentafluorothiopropionyl Fluoride

A solution of 2 parts of pentafluorothiopropionyl fluoride (B.P. approximately 9° C.) in 7 parts of diethyl ether is cooled in a bath of solid carbon dioxide and acetone and 2 drops of dry dimethylformamide is added. The ether solution is allowed to remain in the cold bath for three hours and is then allowed to warm to room temperature. Methyl alcohol is added to the solution and the polymer that separates is collected and dried. There is obtained 1.3 parts of a very light pink, sticky, semi-solid poly(pentafluorothiopropionyl fluoride). This polymer is soluble in diethyl ether but is insoluble in alcohol.

*Analysis.*—Calc'd for $(C_3F_6S)_x$: C, 19.79%; F, 62.61%, S, 17.61%. Found: C, 19.57%; F, 62.41%; S, 17.42%.

EXAMPLE VII

(A) Preparation of Chlorodifluorothioacetyl Fluoride

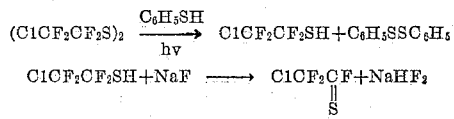

A mixture of 50.3 parts (0.15 mole) of 2-chlorotetrafluoroethyl disulfide (prepared as described in U.S. Patent 2,451,411) and 75 parts (0.68 mole) of thiophenol is irradiated with ultraviolet light for 4 days. During the irradiation a slow stream of nitrogen is bubbled through the reaction mixture and the effluent gases are condensed in a trap cooled by a mixture of solid carbon dioxide and acetone. The condensate is distilled in a spinning band still and there is obtained 3.1 parts of 2-chlorotetrafluoroethanethiol boiling at 33° C. as a pale yellow liquid.

The 2-chlorotetrafluoroethanethiol is dehydrofluorinated by sodium fluoride pellets as described in Example I and there is obtained chlorodifluorothioacetyl fluoride boiling at 17–19° C. as a deep yellow liquid.

(B) Polymerization of Chlorodifluorothioacetyl Fluoride

A solution of 2 parts of chlorodifluorothioacetyl fluoride in 7 parts of dry diethyl ether is cooled to −80° C. and 1 drop of a 50% solution of dimethylformamide in diethyl ether is added. The solution is agitated and is then allowed to remain at −80° C. for 2 hours. The solution is warmed to room temperature and the solvent is evaporated by a stream of nitrogen. A film of rubbery polymer is left. The poly(chlorodifluorothioacetyl fluoride) is collected, washed with acetone and dried under vacuum for 16 hours. The resulting polymer is hard and crystalline but not brittle. It becomes rubbery when heated above 50° C. and sticky at temperatures above 100° C.

*Analysis.*—Calc'd for $(C_2ClF_3S)_x$: C, 16.17%; Cl, 23.87%; F, 38.24%; S, 21.58%. Found: C, 16.46%; Cl, 24.06%; F, 38.24%; S, 21.51%.

EXAMPLE VIII

(A) Preparation of Trifluorothioacetyl Fluoride

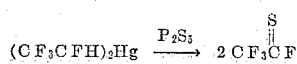

A 300-ml. three-necked flask fitted with a thermocouple, vertical glass tube 1 inch in diameter and 18 inches long to which is affixed a trap cooled by acetone-solid carbon dioxide, and means for adding solid reactants in a nitrogen atmosphere is charged with 100 g. of phosphorus pentasulfide. The flask is flushed with nitrogen and heated to cause the phosphorus pentasulfide to reflux (520° C.) a few inches up the glass tube. To the refluxing pentasulfide is added in small portions during 15 minutes 27.0 g. of bis(1-hydroperfluoroethyl)mercury. The reaction products collected in the cold trap are distilled and there is obtained 1 ml. of trifluorothioacetyl fluoride, which is identified by its nuclear magnetic resonance spectrum.

(B) Copolymerization of Trifluorothioacetyl Fluoride With Thiocarbonyl Fluoride In a polymerization vessel cooled in a solid carbon dioxide/acetone mixture and blanketed with helium are placed 14 parts of anhydrous ether, 10.5 parts of thiocarbonyl fluoride and 3 parts of trifluorothioacetyl fluoride. To the resulting solution is added a solution of about 0.1 part of N-methylmorpholine in 3.5 parts of anhydrous ether. Polymerization begins almost immediately. After 5 hours, much solid polymer has precipitated and the reaction mixture is poured into hot hydrochloric acid (conc. HCl diluted with an equal volume of water). The polymer is washed with water and with acetone and is dried in vacuo at 60° C. It amounts to 9.7 parts.

The crude polymer is dissolved in 595 parts of chloroform (no residue) and is precipitated by adding 40 parts of methanol to the chloroform solution. The filtered and dried (60° C., in vacuo) polymer amounts to 8.8 parts. The polymer can be pressed to a limp, opaque film at 150° C. and 10,000 lbs. ram pressure. The polymer slowly crystallizes on standing at room temperature. It exhibits an inherent viscosity of 1.19, measured in 0.1% chloroform solution. Analyses indicate a $CF_2S/CF_3CSF$ ratio of 88:12. The ratio of monomers charged is 85:15.

*Analysis.*—Calc'd for $[CF_2S]_8[CF_3CSF]_1$: C, 15.3%; F, 48.2%; S, 36.5%. Found: C, 15.36%; F, 48.78%; S, 36.53%.

EXAMPLE IX

(A) Preparation of Trifluorothioacetyl Fluoride

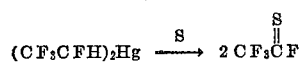

Following the procedure of Example VIII 33.0 g. of bis(1-hydroperfluoroethyl)mercury is added in increments over a period of 20 minutes to 100 g. of refluxing sulfur (445° C.). There is obtained in the cold trap 7.0 ml. of crude product which on distillation yields 9.0 g. (56% of theory) of trifluorothioacetyl fluoride.

(B) Copolymerization of Trifluorothioacetyl Fluoride With Thiocarbonyl Fluoride In a polymerization vessel cooled in a solid carbon dioxide/acetone mixture and blanketed with helium are placed 7 parts of anhydrous ether, 4.5 parts of thiocarbonyl fluoride and 4.5 parts of trifluorothioacetyl fluoride. To the resulting solution is added a solution of about 0.1 part of tetraisopropyl titanate in 3.5 parts of anhydrous ether. The polymerization is run five hours at −80° C. and the reaction mixture is then poured into methanol. The polymer is separated by decantation, washed with methanol and dried in vacuo at 60° C. The polymer is dissolved in 248 parts of chloroform (0.8 part residue) and is then precipitated with 60 parts of methanol. After drying at 60° C. in vacuo it amounts to 5.1 parts. The polymer can be pressed to a limp, opaque film at 150° C. and 10,000 lbs. ram pressure. The polymer exhibits an inherent viscosity of 1.01 (measured in 0.1% chloroform solution) and does not crystallize at 28° C. Analyses show it to contain a $CF_2S/CF_3CSF$ ratio of about 60:40. The ratio of monomers charged is 62:38.

*Analysis.*—Calc'd for $(CF_2S)_3(CF_3CFS)_2$: C, 16.5%; S, 31.4%; F, 52.1%. Found: C, 16.20%; S, 31.84%; F, 50.14%.

EXAMPLE X

(A) Preparation of Trifluorothioacetyl Fluoride

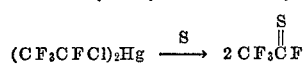

In a 500 ml. round-bottom flask equipped with a means for adding solid mercurial in a nitrogen atmosphere, a nitrogen inlet tube, and an air condenser leading to a trap cooled by solid carbon dioxide is placed 100 g. of powdered sulfur. The sulfur is then heated to 480–500° C. (vigorous refluxing) and 50 g. of bis(1-chloroperfluoroethyl)mercury is added in 1–2 g. increments over a period of 1 hour. The liquid product obtained in the cold trap (19 ml. at −80° C.) is transferred to a low temperature still. On distillation there is obtained as a center cut 18 g. of pure trifluorothioacetyl fluoride, B.P. −22° C. The yield of crude acid fluoride is 92%, that of the purified material is 60%.

(B) Copolymerization of Trifluorothioacetyl Fluoride With Thiocarbonyl Fluoride and Chlorofluorothioacetyl Fluoride In a polymerization vessel cooled in a solid carbon dioxide/acetone bath and blanketed with nitrogen are placed 14 parts of anhydrous ether, 6 parts of thiocarbonyl fluoride, 2.3 parts of $CF_3CSF$ and 0.8 part of chlorofluorothioacetyl fluoride. To the resulting solution is added a solution of about 0.05 part of N-methylmorpholine in 3.5 parts of ether. Polymerization begins immediately. After 5 hours the reaction mixture is poured into methanol, the methanol is decanted, the residue is washed with methanol and dried in air at room temperature. It amounts to 5.4 parts. The polymer is dissolved in 447 parts of chloroform (no residue) and is precipitated with 60 parts of methanol. After drying in vacuo at 60° C. it amounts to 5.0 parts. The polymer can be pressed to a limp, semi-elastic, opaque film at 150° C. and 10,000 lbs. ram pressure, has an inherent viscosity of 0.82 (0.1% solution in chloroform) and is shown by elemental analysis to contain all three comonomers. Analysis found: S, 34.47%; Cl, 1.11%.

EXAMPLE XI

(A) Preparation of Pentafluorothio-3-Butenoyl Fluoride

Forty parts of sulfur is placed in the bottom of an upright U-tube 1″ in diameter and 12″ high. One end of the U-tube is fitted with a dropping funnel and the other end is connected to a trap cooled by a mixture of acetone and solid carbon dioxide. A slow stream of nitrogen is passed through the tube and the sulfur is heated until its vapor refluxes about 4″ up the arms of the tube. 4,4-diiodoperfluoro-1-butene (6.2 parts) is added dropwise over a period of 30 minutes through the dropping funnel. The liquid that condenses in the cold trap is distilled at atmospheric pressure. There is obtained 2.04 parts of a bright yellow liquid boiling at 45–46° C., which is perfluorothio-3-butenoyl fluoride.

*Analysis.*—Calc'd for $C_4F_6S$: C, 24.75%; F, 58.73%; S, 16.52%. Found: C, 24.63%; F, 58.58%; S, 16.82%.

(B) Polymerization of Pentafluorothio-3-Butenoyl Fluoride

A sample of pentafluorothio-3-butenoyl fluoride is sealed in a glass tube and stored at room temperature for two weeks. At the end of this period, the sample has become solid. The tube is opened and the solid polymer of pentafluorothio-3-butenoyl fluoride is removed. It is a rubbery yellow solid that maintains its rubbery characteristics at temperatures up to its decomposition point, which is 240° C. The polymer is pressed at 225° C. under 15,000 lbs./sq. in. to a clear film which is tough and resistant to solvents. The polymer is insoluble in acetone, ether, ethyl alcohol, pentane, benzene, dimethylformamide, nitric acid, and 10% aqueous sodium hydroxide.

*Analysis.*—Calc'd for $(C_4F_6S)_n$: C, 24.75%; S, 16.52%. Found: C, 24.55%; S, 16.40%.

EXAMPLE XII

Copolymerization of Trifluorothioacetyl Fluoride With Propylene

A mixture of 4.2 parts (0.1 mole) of propylene and 13.2 parts (0.1 mole) of trifluorothioacetyl fluoride is sealed in a glass tube and kept at room temperature (about 25° C.) for 3 days. The tube is cooled to —78° C., opened, and then allowed to warm to room temperature. A white, rubbery polymeric material remains in the tube. A colorless, clear elastomeric film is pressed from it at 60° C. and 10,000 lbs./sq. in. Elemental analyses indicate the copolymer contains 11% propylene and 89% trifluorothioacetyl fluoride.

*Analysis.*—Calc'd for 89% $C_2F_4S$+11% $C_3H_6$: F, 51.21%; S, 21.89%. Found: F, 51.22%; S, 21.60%.

The examples have illustrated the polymers of this invention, including both α-fluorothioacyl fluoride homopolymers and copolymers. The invention includes any α-fluorothioacyl fluoride polymer having recurring structural units,

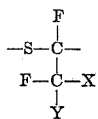

wherein X and Y represent hydrogen, halogen, monovalent hydrocarbon or halogenated monovalent hydrocarbon radicals. Thus, in addition to specific polymers illustrated by the examples, other specific polymers that can be mentioned include polymers of monofluorothioacetyl fluoride, pentafluorothio-3-butenoyl fluoride, and 2,2-difluorothiopropionyl fluoride.

The polymers of α-fluorothioacyl fluorides of this invention, including copolymers with other copolymerizable monomers, are useful for a wide variety of purposes in view of the wide range of properties they possess, i.e., varying from sticky, semi-solids, to plastics, to elastomeric solids. The semi-solid, sticky polymers are useful as adhesives. Since the solid polymers flow at temperatures up to about 150° C., they are particularly useful for use as molding compositions. The solid polymers are also useful when shaped into self-supporting films, which range from opaque to transparent films, by either solvent casting or pressing. The films prepared from the solid polymers having elastomeric properties can be used in those applications where films and sheets having elastomeric properties are ordinarily used. Likewise, the films prepared from the plastic polymers can be used in those applications where plastic films and sheets are ordinarily used. Polymeric trifluorothioacetyl fluoride is especially useful as an elastomer.

The α-fluorothioacyl polymers are also useful as electrical insulation for flexible metal objects, e.g., for wire and plates. As an illustration, copper wire is heated in a flame and then drawn back and forth between a folded film of difluorothioacetyl fluoride polymer. When the wire is cooled the previously heated area is coated with the polymer. This polymer coating does not break off when the wire is bent sharply several (4–5) times. Thus, these polymers are useful as insulating coatings on wires.

In addition to its utility in the preparation of polymers, trifluorothioacetyl fluoride is useful as a fumigant. It is particularly effective against houseflies as shown by the following test. The introduction of 300 mg. of trifluorothioacetyl fluoride into a closed container of about 450 cc. capacity containing 50 adult houseflies (3–4 days old) and a 2% sugar solution as a food source caused a 100% knockdown of the flies before the fumigant was completely introduced. One hour after the fumigant was introduced, the lid was removed from the container in order to evacuate the free gas and at the end of a 20-hour count all the flies were dead. In a control test carried out in the same way with the same number of flies but with the single exception that no fumigant was used, no dead flies were observed.

The foregoing detailed description has been given for clearness of understanding only and no unnecessary limitations are to be understood therefrom. The invention is not limited to the exact details described, for obvious modifications will occur to those skilled in the art.

The embodiments of the invention in which an exclusive property or privilege is claimed are defined as follows:

1. Polymers having the sole recurring unit

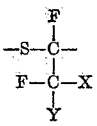

wherein X and Y are selected from the group consisting of hydrogen, halogen, alkyl of 1–6 carbon atoms and halogenated alkyl of 1–6 carbon atoms.

2. Polymers having as the sole recurring unit

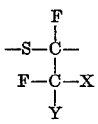

wherein X and Y are perfluoroalkyl of 1–6 carbon atoms.

3. Copolymers wherein at least 5% of the number of recurring units are

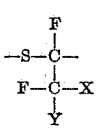

wherein X and Y are as defined in claim 1, and the remaining recurring units are provided by polymerizable ethylenically unsaturated compounds free of thiocarbonyl groups.

4. Pentafluorothio-3-butenoyl fluoride.
5. Polymers of claim 1 in the form of pressed shaped structures.
6. Polymers of claim 1 in the form of self-supporting films.
7. Poly(trifluorothioacetyl fluoride).
8. Poly(pentafluorothiopropionyl fluoride).
9. Poly(chlorodifluorothioacetyl fluoride).
10. Trifluorothioacetyl fluoride.
11. Process for preparing polymers which comprises cooling a monomer selected from the class consisting of α-fluorothioacyl fluorides and mixtures thereof with at least one other copolymerizable monomer selected from polymerizable ethylenically unsaturated compounds free of thiocarbonyl groups to a temperature of from 0° to about —120° C., and effecting contact between said cooled monomer and an ionic initiator, said initiator being present in amount of from 0.2% to 20% of the monomer being polymerized.
12. Process for preparing polymers described in claim 1 which comprises subjecting a monomeric α-fluorothioacyl fluoride to a temperature of from 0° C. to about —120° C. in the presence of an ionic initiator, said initiator being present in an amount of from 0.2% to 20% of the monomeric α-fluorothioacyl fluoride.
13. The process of claim 11 wherein the polymerization is effected in the presence of an inert solvent which is liquid at the operating temperature.
14. The process of claim 11 wherein the polymerization is effected in the presence of dimethylformamide and diethyl ether, said dimethylformamide being present in an amount of from 0.2% to 20% of the monomer being polymerized.
15. Process for polymerizing pentafluorothio-3-butenoyl fluoride which comprises storing said fluoride in a closed container under autogenous pressure for a time sufficient to effect substantial homopolymerization.
16. Process which comprises mixing substantially equal molecular quantities of propylene and trifluorothioacetyl fluoride and storing said mixture in a closed container under autogenous pressure for a period sufficient to effect substantial copolymerization.

17. Polymers of claim 7 in the form of self-supporting films.

18. Polymers of claim 8 in the form of self-supporting films.

19. Polmyers of claim 9 in the form of self-supporting films.

References Cited in the file of this patent

UNITED STATES PATENTS 2,480,467 Haworth et al. _____ Aug. 30, 1949

OTHER REFERENCES

Lovelace et al.: "Aliphatic Fluorine Compounds," Reinhold Publishing Company, New York, 1958, page 337.